United States Patent [19]

Ishii et al.

[11] 4,089,726

[45] May 16, 1978

[54] ADHESIVE COMPRISING POST-CHLORINATED POLYETHYLENE AND POLYVINYL CHLORIDE

[75] Inventors: Ko Ishii, Takatsuki; Tadamasa Yoshida, Kobe, both of Japan

[73] Assignee: Sumitomo Bakelite Company, Limited, Tokyo, Japan

[21] Appl. No.: 642,945

[22] Filed: Dec. 22, 1975

Related U.S. Application Data

[62] Division of Ser. No. 428,997, Dec. 27, 1973, abandoned.

[30] Foreign Application Priority Data

| Dec. 27, 1972 | Japan | 47-129989 |
| Dec. 27, 1972 | Japan | 47-129990 |
| Dec. 27, 1972 | Japan | 47-129991 |
| Dec. 22, 1972 | Japan | 47-129992 |

[51] Int. Cl.² ............................................. B32B 27/06
[52] U.S. Cl. ........................ 156/306; 156/244.24; 260/897 C; 264/171; 264/175; 428/518; 156/244.27

[58] Field of Search ............ 264/171, 173, 95, 176 R, 264/175; 260/29.1, 897, 897 C; 156/90, 244, 229, 228, 242, 243, 306, 333, 222; 428/518

[56] References Cited

U.S. PATENT DOCUMENTS

| 2,592,763 | 4/1952 | Taylor | 526/22 |
| 2,628,208 | 2/1953 | Loukomsky | 260/897 M |
| 3,006,889 | 10/1961 | Frey | 260/897 |
| 3,022,263 | 2/1962 | Orthner et al. | 260/34.2 |
| 3,184,358 | 5/1965 | Utz | 156/244 |
| 3,355,519 | 11/1967 | Müller et al. | 260/897 |
| 3,401,129 | 9/1968 | McGinley | 260/34.2 |
| 3,524,795 | 8/1970 | Peterson | 156/244 |

*Primary Examiner*—Jeffery R. Thurlow
*Attorney, Agent, or Firm*—Sughrue, Rothwell, Mion, Zinn and Macpeak

[57] ABSTRACT

An adhesive composition particularly suitable for adhering polyvinyl chloride and an olefinic polymer comprising 1 to 99% by weight of post-chlorinated polyethylene having a mean molecular weight of about 20,000 to 200,000, a specific gravity of 1.00 to 1.35 and a chlorine content of 5 to 50% by weight and 99 to 1% by weight of polyvinyl chloride having a mean degree of polymerization of about 300 to 2,500.

8 Claims, No Drawings

ADHESIVE COMPRISING POST-CHLORINATED POLYETHYLENE AND POLYVINYL CHLORIDE

This is a division of application Ser. No. 428,997 filed Dec. 27, 1973 now abandoned.

BACKGROUND OF THE INVENTION

1. Field of the Invention

The present invention relates to a thermoplastic resin type adhesive composition and a method of using the adhesive composition. More particularly, the invention relates to an adhesive composition comprising post-chlorinated polyethylene and polyvinyl chloride and also to a heat sealing method for polyvinyl chloride and olefinic polymer using the adhesive composition.

2. Description of the Prior Art

Conventional adhesive compositions are generally classified into a thermoplastic resin-type adhesive, a thermosetting resintype adhesive, a rubber-type adhesive, and a natural adhesive. Strictly speaking, the natural adhesive can be included in the above three-kinds of adhesives from the viewpoint of the chemical structure but for the sake of convenience, the natural adhesive is classified as above. The above-described three kinds of adhesives other than the natural adhesive are prepared synthetically and hence there are many types of adhesives within each class of these adhesives.

Furthermore, in practically using such adhesives, they are used individually or as a mixture of two or three kinds of adhesives. Moreover, they are frequently used as a mixture thereof with such additives as solvents, fillers, extenders, etc.

Accordingly, the kinds of adhesives are almost innumerable with each having different properties and they are used for their own individual purposes. In other words, no such single universal type adhesive is known which can be used for all purposes. In fact the most suitable adhesive for the specific purpose is used from a practical standpoint.

SUMMARY OF THE INVENTION

The inventors have, therefore, investigated various kinds of thermoplastic resin-type adhesives and as the results thereof it has been discovered that an excellent adhesive having a wide range of uses can be obtained by blending post-chlorinated polyethylene and polyvinyl chloride.

An object of this invention is to provide a novel and inexpensive adhesive mainly comprising polyvinyl chloride.

Another object of this invention is to provide a heat sealing method using this adhesive.

Still another object of this invention is to provide a composite material prepared using the adhesive.

That is, the present invention provides a solid-type adhesive comprising 1 to 99% by weight of post-chlorinated polyethylene which has a mean molecular weight of about 20,000 to 200,000, a specific gravity of 1.00 to 1.35 and a chlorine content of 5 to 50% by weight, preferably which has a mean molecular weight of about 20,000 to 100,000, a specific gravity of 1.10 to 1.30 and a chlorine content of 25 to 40% by weight, and 99 to 1% by weight of polyvinyl chloride having a mean degree of polymerization of about 300 to 2,500, preferably 400 to 2,000, and further, the invention provides a liquid adhesive prepared by dissolving the above described solid adhesive of this invention in a solvent.

The term "mean molecualr weight" used throughout the specification and claims refers to a number mean molecular weight.

According to a further embodiment of this invention, there is provided a method of adhering polymers using the above described adhesive composition. Still further, the invention provides a heat sealing method of adhering an olefinic polymer and polyvinyl chloride without using an adhesive.

It is effective to select the blend ratio of post-chlorinated polyethylene and polyvinyl chloride in the adhesive of this invention depending on the materials to be adhered to each other. Further, the adhesive of this invention can adhere polyvinyl chloride and an olefinic polymer by heat sealing without the necessity of any specific surface pre-treatment, which has hitherto been considered to be difficult.

DETAILED DESCRIPTION OF THE INVENTION

Polyvinyl chloride and an olefinic polymer such as polyethylene, polypropylene, etc., have now been used in large quantities due to their excellent properties and their low cost.

The total amount of both polymers is far larger than the half of the total amounts of all plastics or polymers used practically at present. However, although it is possible to adhere an olefinic polymer and polyvinyl chloride using an adhesive or adhesives, it is almost impossible to heat seal the polymers since olefinic polymers are generally poor in polarity and are crystalline while polyvinyl chloride is a polar material and is poor in crystallinity.

As methods of adhering an olefinic polymer and polyvinyl chloride, adhering the polymers with an adhesive or adhesives after activating the surface of the olefinic polymer by the action of an organic peroxide, the irradiation with ionizing radiation, the action of an oxidizing gas, etc., are known. However, it has been impossible to heat seal olefinic polymers and polyvinyl chloride without using some type of treatment as stated above and a third material.

Thus, the present invention also provides a method of heat sealing an olefinic polymer and polyvinyl chloride capable of adhering both polymers by only contacting and pressing them together under heating without using any adhesive and without applying any surface activation treatment to the olefinic polymer.

That is, in the heat sealing method for polyvinyl chloride and an olefinic polymer according to the present invention, the adhesion of the polymers is conducted by bringing a polyvinyl chloride article into contact with the olefinic polymer and pressing them together under heating, the polyvinyl chloride comprising a blend of from 2 to 50 parts by weight of post-chlorinated polyethylene having a mean molecular weight of about 20,000 to 200,000, preferably 20,000 to 100,000, a specific gravity of 1.00 to 1.35, preferably 1.10 to 1.30, and a chlorine content of 5 to 50%, preferably 25 to 40%, and 100 parts by weight of polyvinyl chloride having a mean degree of polymerization of about 300 to 2,500, preferably 400 to 2,000.

In the present invention, a co-extrusion method to form a co-extruded composite material of polyvinyl chloride and an olefinic polymer in one step using at least two extruders, an extrusion-lamination method to seal onto polyvinyl chloride an olefinic polymer extruded through an extruder, a press method in which adhesion of two components is conducted using a pressing machine, and the like can be employed.

It is well known that polyvinyl chloride can be blended with post-chlorinated polyethylene to improve the impact resistance and the weatherability of the polyvinyl chloride but it is not known that an article comprising a blend of polyvinyl chloride and post-chlorinated polyethylene can be easily heat-sealed to an olefinic polymer.

The olefinic polymers which can be used in this invention include a homopolymer of an olefin having less than 14 carbon atoms, such as polyethylene, polypropylene, polybutene-1, polybutene-2, polyisobutylene, polypentene-1, polypentene-2, poly-2-methylbutene-1, poly-2-methylbutene-2, poly-3-methylbutene-1, etc.; a copolymer of the above described olefins, such as an ethylene/propylene copolymer, an ethylene/1-butene copolymer, an ethylene/1-hexene copolymer, an ethylene/4-methyl-1-pentene copolymer, a propylene/1-butene copolymer, a propylene/1-hexene copolymer, a propylene/4-methyl-1-pentene copolymer, etc.; a copolymer of more than 30% by weight of one or more of the above described olefins and one or more of other monomers capable of copolymerizing with the olefins, such as an ethylene/vinyl acetate copolymer, an ethylene/acrylic acid copolymer, an ethylene/methacrylic acid copolymer, an ethylene/itaconic acid copolymer, an ethylene/maleic acid copolymer, an ethylene/acrylic acid/methyl methacrylate copolymer, an ethylene/itaconic acid/methyl methacrylic acid copolymer, an ethylene/methacrylic acid/vinyl acetate copolymer, an ethylene/acrylic acid/vinyl alcohol copolymer, an ethylene/vinyl chloride copolymer, an ethylene/styrene copolymer, an ethylene/vinylidene chloride copolymer, an ethylene/styrene/acrylic acid copolymer, an ethylene/methacrylic acid/acrylonitrile copolymer, an ethylene/vinyl chloride/acrylic acid copolymer, an ethylene/vinylidene chloride/acrylic acid copolymer, an ethylene/vinyl fluoride/methacrylic acid copolymer, an ethylene/chlorotrifluoroethylene/methacrylic acid copolymer, etc.; a graft copolymer prepared by grafting to a polyolefin or an olefin-containing copolymer of an ethylenically unsaturated compound capable of being graft-polymerized thereto and containing the olefinic component at more than 30% by weight, such as a polyethylene/acrylic acid graft copolymer, a polyethylene/methacrylic acid graft copolymer, a polyethylene/ethyl acrylate graft copolymer, a polypropylene/acrylic acid graft copolymer, a polypropylene/methacrylic acid graft copolymer, a poly-1-butene/acrylic acid graft copolymer, a poly-3-methylbutene/acrylic acid graft copolymer, an ethylene/butene-1/acrylic acid graft copolymer, an ethylene/vinyl acetate/vinyl chloride graft copolymer, etc.; an ionic copolymer, viz., an ionomer resin prepared by the reaction of an ionic metal compound which can be dissolved in water and a compound prepared from an α-olefin and an α,β-ethylenically unsaturated carboxylic acid as an ethylene/acrylic acid copolymer, an ethylene/methacrylic acid copolymer, an ethylene/itaconic acid copolymer, an ethylene/maleic acid copolymer, an ethylene/acrylic acid/methyl methacrylate copolymer, an ethylene/methacrylic acid/ethyl methacrylate copolymer, an ethylene/methacrylic acid/vinyl acetate copolymer, an ethylene/acrylic acid/vinyl alcohol copolymer, an ethylene/styrene/acrylic acid copolymer, an ethylene/propylene/acrylic acid copolymer, an ethylene/vinyl chloride/acrylic acid copolymer, a polyethylene/acrylic acid graft copolymer, a polyethylene/methacrylic acid graft copolymer, a polypropylene/acrylic acid graft copolymer, a polypropylene/methacrylic acid graft copolymer, a poly-3-methylbutene/acrylic acid graft copolymer, etc.; and blends of two or more of the above described homopolymers of the olefins, copolymers of the olefins, copolymers of the olefins and monomers copolymerizable with the olefins, olefinic graft copolymers, and ionomer resins.

The polyvinyl chlorides which can be used in this invention include vinyl chloride homopolymer; a copolymer of vinyl chloride and one or more other monomers copolymerizable with vinyl chloride and containing more than 30% by weight of vinyl chloride, such as a vinyl chloride/ethylene copolymer, a vinyl chloride/propylene copolymer, a vinyl chloride/vinyl acetate copolymer, a vinyl chloride/acrylic acid copolymer, a vinyl chloride/vinylidene chloride copolymer, a vinyl chloride/vinylidene chloride/acrylic acid copolymer, a vinyl chloride/acrylic acid/methacrylic acid copolymer, etc.; a graft copolymer containing more than 30% by weight of vinyl chloride, such as an ethylene/vinyl acetate/vinyl chloride graft copolymer; a post-chlorinated polyvinyl chloride; and a blend of two or more of the above described materials.

Post-chlorinated polyethylene is a rubbery or plastic material prepared by post-chlorinating polyethylene and, it is well known to blend post-chlorinated polyethylene with vinyl chloride to improve impact resistance and weatherability, to blend post-chlorinated polyethylene with rubber to improve ozone resistance, weatherability, chemical resistance, heat resistance, etc., and to blend post-chlorinated polyethylene with an olefinic polymer to improve low-temperature impact resistance and to provide thereto flame resistance.

As previously described, the co-extrusion method, the extrusion-lamination method, the press method and the like can be practically employed as the heat sealing method for polyvinyl chloride and an olefinic polymer. When co-extrusion of the composite material is employed, an extrusion temperature of not more than 220° C and a die temperature of not more than 210° C are preferred. When extrusion-lamination is employed, it is desired that the olefinic polymer be extruded and laminated substantially simultaneously. Further when the press method is employed, the press temperature is desirably set at not more than 210° C. In this process, if the temperature is set at more than 210° C, polyvinyl chloride is thermally decomposed and a deterioration in efficiency can be expected.

The composite materials prepared by the present invention are very useful for packaging. For example, in this method, the contents to be packaged are packed in an evacuated container or rigid polyvinyl chloride and then heat sealing is conducted using as a sealing material of the adhesive material of this invention.

Post-chlorinated polyethylene can be added to polyvinyl chloride by a manner similar to the techniques used in blending various conventional additives and no special techniques need be used.

As described above, the liquid adhesive of this invention comprises the solid adhesive of this invention in a suitable solvent. Examples of suitable solvents which can be employed in the liquid adhesive composition of this invention are aromatic hydrocarbons such as benzene, toluene and the like, chlorinated organic compounds such as carbon tetrachloride, trichloroethylene, tetrachloroethylene, tetrachloroethane, chlorobenzene and the like, tetrahydrofuran, methyl ethyl ketone, cyclohexanone and the like. Further, a mixture of solvents can be optionally employed. The amount of the solvent generally used is about 98 to 70% by weight, preferably 95 to 80% by weight, in the liquid adhesive. The post-chlorinated polyethylene is not always completely dissolved in the organic solvent, and the adhesive of this invention can be suitably employed in the form of a uniform gel condition or a uniform swelled condition.

Also, the adhesive composition of this invention can contain additionally materials which are conventionally used for improving the properties and processability of polyvinyl chloride. For example, processing aids, modifiers, stabilizers, lubricants, pigments, reinforcing agents, plasticizers, extenders, antioxidants and the like can be added in a small proportion to the composition of this invention.

The features of the co-extruded composite material of polyvinyl chloride and the olefinic polymer according to the present invention are as follows: That is, the production cost for the composite material is quite low since the two polymers having different properties can be heat sealed to each other in one step. The composite material having both gas barrier characteristics and steam barrier characteristics is obtained by compositing a vinyl chloride resin having excellent gas barrier characteristics and an olefinic polymer having excellent moisture proof properties. Moreover, since the composite material of this invention is composed of a layer of polyvinyl chloride resin and a layer of an olefinic polymer, other materials which can be heat sealed with the olefinic polymer but cannot be heat sealed with the polyvinyl chloride resin or other materials which can be heat sealed with the polyvinyl chloride resin but cannot be heat sealed with the olefinic polymer can be heat sealed with the composite material of this invention by selecting the appropriate surface to be heat sealed depending on the material to which the composite is to be adhered.

According to the present invention a multi-layer composite material having three or more polymeric layers can be produced by co-extrusion. For example, a five-layer composite material composed of a central olefinic polymer layer, intermediate polyvinyl chloride layers heat sealed to both surfaces of the central olefinic polymer layer, and outer layers of a material which can be heat sealed with the polyvinyl chloride but cannot be heat sealed with the olefinic polymer, these outer layer being heat sealed to the outer surfaces of the intermediate polyvinyl chloride layers, can be prepared by co-extrusion in one step. Also, a five-layer composite material composed of a central polyvinyl chloride layer, intermediate olefinic polymer layers, and outer layers of a material which can be heat sealed with the olefinic polymer but cannot be heat sealed with the polyvinyl chloride can be prepared by co-extrusion.

The composite materials prepared by the present invention can be used for various purposes such as food packaging, packaging of tablets of medicaments or chemicals, etc.

The following examples are intended to illustrate specifically the present invention but not to limit the present invention in any way. In the examples all parts and percents are by weight unless otherwise indicated.

EXAMPLE 1

Polyvinyl chloride having a polymerization degree of 400 and non-crystalline post-chlorinated polyethylene having a mean molecular weight of about 40,000 and a chlorine content of 30% were dissolved in the solvent as shown in the following table in the ratio as shown in the same table.

|  | 1 | 2 | 3 | 4 | 5 | 6 |
|---|---|---|---|---|---|---|
|  | (parts by weight) | | | | | |
| Polyvinyl Chloride | 100 | 100 | 100 | 50 | 10 | 0 |
| Post-chlorinated Polyethylene | 0 | 3 | 30 | 50 | 100 | 100 |
| Ca-Zn Type Metal Soap | 2 | 2 | 2 | 1 | 0.2 | 0 |
| Methyl Ethyl Ketone | 500 | 500 | 500 | 500 | 500 | 500 |
| Tetrahydrofuran | 500 | 500 | 500 | 500 | 500 | 500 |

Each of the adhesives thus prepared was applied to an aluminum foil having a thickness of 25 microns using an applicator and dried. Then, the aluminum foil having the adhesive layer was heat sealed to a low-density polyethylene film having a thickness of 80 microns. In this case, the aluminum foil side was placed toward the hot plate of the heat sealing machine and the heat sealing was conducted under the following conditions:

| Temperature of the Hot Plate: | 150° C |
|---|---|
| Pressure Applied: | 2 kg/cm$^2$ |
| Heat Seal Period of Time: | 1.0 second. |

In addition, the polyethylene film used above was not subjected to any surface treatment, such as a corona-discharge treatment.

When the heat sealed samples prepared were subjected to a peeling test according to the method of ASTM-D-1876-61T, the results shown in Table 1 were obtained.

Table 1

|  | 1 | 2 | 3 | 4 | 5 | 6 |
|---|---|---|---|---|---|---|
| Peel Strength (kg/inch) | 0 | 0.2 | 0.9 | 1.5 | 1.7 | 1.5 |

EXAMPLE 2

After applying the adhesive as used in Example 1 to an aluminum foil followed by drying as described in Example 1, a rigid polyvinyl chloride sheet having a thickness of 200 microns was heat sealed to the foil under the following conditions:

| Hot Plate Temperature: | 160° C |
|---|---|
| Pressure Applied: | 4 kg/cm$^2$ |
| Heat Seal Period of Time: | 2 seconds. |

When the samples thus prepared were subjected to the peeling test as described in Example 1, the results shown in the following table were obtained.

Table 2

|  | 1 | 2 | 3 | 4 | 5 | 6 |
|---|---|---|---|---|---|---|
| Peel Strength (kg/inch) | 4.5 | 4.7 | 5.5 | 5.8 | 4.3 | 3.0 |

EXAMPLE 3

Polyvinyl chloride containing 5% vinyl acetate and having a mean polymerization degree of 400 and non-crystalline post-chlorinated polyethylene having a mean molecular weight of about 40,000 and a chlorine content of 35% were dissolved in the solvent as shown in the following table in the ratio shown in the same table.

|  | 7 | 8 | 9 | 10 | 11 | 12 |
|---|---|---|---|---|---|---|
| Polyvinyl Chloride containing 5% Vinyl Acetate | 100 | 100 | 100 | 50 | 10 | 0 |
| Post-chlorinated Polyethylene | 0 | 3 | 30 | 50 | 100 | 100 |
| Ca-Zn Type Metal Soap | 2 | 2 | 2 | 1 | 0.2 | 0 |
| Toluene | 500 | 500 | 500 | 500 | 500 | 500 |
| Ethyl Acetate | 500 | 500 | 500 | 500 | 500 | 500 |

After applying the adhesive thus prepared to a rigid polyvinyl chloride sheet having a thickness of 250 microns using an applicator followed by drying, a low-density polyethylene film having a thickness of 80 microns, which had not be subjected to any surface treatment, was heated sealed to the polyvinyl chloride sheet under the following conditions:

| Hot Plate Temperature: | 150° C |
|---|---|
| Pressure Applied: | 2 kg/cm$^2$ |
| Heat Seal Period of Time: | 2 seconds. |

Then, when the samples thus heat sealed were subjected to the peeling test according to the method of ASTM-D-1876-61T, the results shown in the following table were obtained.

Table 3

|  | 7 | 8 | 9 | 10 | 11 | 12 |
|---|---|---|---|---|---|---|
| Peel Strength (kg/inch) | 0 | 0.3 | 1.2 | 1.8 | 1.6 | 1.3 |

EXAMPLE 4

After applying the adhesive as used in Example 3 to a 6-nylon film having a thickness of 80 microns, which had not been subjected to any surface treatment, followed by drying, a rigid polyvinyl chloride sheet having a thickness of 250 microns or a polyethylene sheet having a thickness of 250 microns was heat sealed to the 6-nylon film under the following conditions:

| Hot Plate Temperature: | 220° C |
|---|---|
| Pressure Applied: | 2 kg/cm$^2$ |
| Heat Seal Period of Time: | 2 seconds. |

When the samples thus heat sealed were subjected to the peeling test as described in Example 3, the results shown in Table 4 were obtained.

Table 4

|  | Peeling Test Results (kg/inch) | | | | | |
|---|---|---|---|---|---|---|
|  | 7 | 8 | 9 | 10 | 11 | 12 |
| 6-Nylon Polyvinyl chloride | 0 | 0.1 | 0.8 | 2.7 | 2.9 | 3.0 |
| 6-Nylon/Polyethylene | 0 | 0.1 | 0.3 | 1.1 | 1.5 | 1.8 |

EXAMPLE 5

Two sheets of films, each having a thickness of 50 microns, were prepared using the two kinds of the resin compositions respectively shown in the following table using a calender roller of 18 inches:

|  | 13 | 14 |
|---|---|---|
| Polyvinyl Chloride (mean polymerization degree 800) | 100 | 100 |
| Post-chlorinated Polyethylene (mean molecular weight, about 45,000; Cl-content, 30%) | 20 | 0 |
| Ca-Zn Type Metal Soap | 2 | 2 |
| Stearic Acid (lubricant) | 2 | 2 |
| Epoxidized Soybean Oil | 2 | 2 |

Then, each of the films prepared above was sandwiched between a 6-nylon film having a thickness of 80 microns, which was not subjected to any surface treatment, and a rigid polyvinyl chloride film having a thickness of 100 microns and they were heat sealed under the following conditions:

| Hot Plate Temperature | 220° C. |
|---|---|
| Pressure Applied: | 2 kg/cm$^2$ |
| Heat Seal Period of Time: | 2 seconds. |

Then, when a peeling test was conducted between the 6-nylon film and the rigid polyvinyl chloride film of the heat sealed samples according to the method of ASTM-D-1876-61T, the results shown in the following table were obtained.

Table 5

|  | 13 | 14 |
|---|---|---|
| Peel Strength (kg/inch) | 1.7 | 0 |

The results showed that the film composed of the blend of post-chlorinated polyethylene and polyvinyl chloride was effective for adhering the 6-nylon film and the rigid polyvinyl chloride film as a film-form adhesive.

EXAMPLE 6

Heat sealing procedures were conducted under the heat sealing conditions as described in Example 5 using the film-form adhesive as used in Example 5. The films heat sealed using the film-form adhesive were shown in the following table. The results obtained of the peeling test of the heat sealed samples are shown in the same table.

Table 6

|  | 13 | 14 |
|---|---|---|
| Rigid Polyvinyl Chloride (thickness of 100 μ) Low-density Polyethylene (thickness of 80 μ) | 2.5 | 0 |
| Rigid Polyvinyl Chloride (thickness of 100 μ) Aluminum Foil (thickness of 25 μ) | 4.3 | 0 |
| Low-density Polyethylene (thickness of 80 μ) Aluminum Foil (thickness of 25 μ) 6-Nylon (thickness 80 μ) | 0.8 | 0 |

Table 6-continued

|  | 13 | 14 |
|---|---|---|
| Low-density Polyethylene (thickness of 80 μ) | 0.4 | 0 |

EXAMPLE 7

Each of four kinds of vinyl chloride copylmers and noncrystalline post-chlorinated polyethylene having a mean molecular weight of about 30,000 and a chlorine content of 35% were dissolved in the solvent as shown in the following table to provide four kinds of adhesives. The vinyl chloride copolymers used in the above procedures were as follows:

Adhesive No. 15: Vinyl chloride copolymer having an apparent mean polymerization degree of about 400 and containing 1% ethylene.

Adhesive No. 16: Vinyl chloride copolymer having an apparent mean polymerization degree of about 450 and containing 10% acrylic acid.

Adhesive No. 17: Ethylene/vinyl acetate/vinyl chloride graft copolymer having a mean polymerization degree of about 800, (Sumigraft GB, trade name, produced by Sumitomo Chemical Co., Ltd.)

Adhesive No. 18: Chlorinated polyvinyl chloride having an apparent mean polymerization degree of about 700 and containing 65% chlorine.

|  | 15 | 16 | 17 | 18 |
|---|---|---|---|---|
| Vinyl Chloride Copolymer | 100 | 100 | 100 | 100 |
| Post-chlorinated Polyethylene (mean molecular weight, about 30,000; chlorine content, 35%) | 20 | 20 | 20 | 20 |
| Ca-Zn Type Metal Soap | 2 | 2 | 2 | 2 |
| Methyl Ethyl Ketone | 500 | 500 | 500 | 500 |
| Tetrahydrofuran | 500 | 500 | 500 | 500 |

After applying each of the adhesives to a 6-6-nylon sheet having a thickness of 50 microns, which had not been subjected to any surface treatment, using an applicator followed by drying a rigid polyvinyl chloride sheet having a thickness of 250 microns was heat sealed to the nylon sheet in the case of using adhesive No. 15, a polypropylene sheet having a thickness of 100 microns was heat sealed in the case of using adhesive No. 16, an ethylene acrylic acid copolymer sheet having a thickness of 50 microns was heat sealed in the case of using adhesive No. 17, and an ethylene/sodium methacrylate ionomer sheet having a thickness of 50 microns in the case of using adhesive No. 18. The heat seal conditions were as follows:

| Hot Plate Temperature: | 220° C |
|---|---|
| Pressure Applied: | 2 kg/cm$^2$ |
| Heat Seal Period of Time: | 2 seconds |

Thereafter, the peel strength in each case was measured, the results of which were shown in the following table.

Table 7

|  | 15 | 16 | 17 | 18 |
|---|---|---|---|---|
| Peel Strength (kg/inch) | 0.8 | 0.5 | 1.4 | 0.7 |

EXAMPLE 8

The following eight kinds of films each having a thickness of 50 microns were prepared using a calendar roller of 18 inches. Then, each of the adhesive films was sandwiched between the specific films and after heat sealing them, the peel strength was measured in each case. The results obtained are shown in the following table together with the compositions of the adhesive films used.

Table 8

|  | 19 | | 20 | | 21 | | 22 | |
|---|---|---|---|---|---|---|---|---|
|  | a | b | a | b | a | b | a | b |
| Vinyl Chloride Copolymer* | 100 | 100 | 100 | 100 | 100 | 100 | 100 | 100 |
| Post-chlorinated Polyethylene (mean molecular weight, about 30,000; chlorine content, 35%) | 20 | 0 | 20 | 0 | 20 | 0 | 20 | 0 |
| Ca-Zn Type Metal Soap | 2 | 2 | 2 | 2 | 2 | 2 | 2 | 2 |
| Stearic Acid (lubricant) | 2 | 2 | 2 | 2 | 2 | 2 | 2 | 2 |
| Epoxidized Soybean Oil | 2 | 2 | 2 | 2 | 2 | 2 | 2 | 2 |
| Specific Films** | A E | A E | B E | B E | C F | C F | D G | D G |
| Peel Strength (kg/inch) | 2.0 | 0 | 2.4 | 0 | 0.9 | 0 | 0.5 | 0 |

Note:
(*):Adhesive No. 19: Vinyl chloride copolymer having an apparent average polymerization degree of about 750 and containing 1% ethylene.
Adhesive No. 20: Vinyl chloride copolymer having an apparent average polymerization degree of about 800 and containing 10% acrylic acid.
Adhesive No. 21: Ethylene/vinyl acetate/vinyl chloride graft copolymer having a mean polymerization degree of about 1,000, (Sumigraft GA, trade name, produced by Sumitomo Chemical Co., Ltd.).
Adhesive No. 22: Chlorinated polyvinyl chloride having an apparent mean polymerization degree of about 700 and containing 65% chlorine.
(**):
Film A: A film of a blend of 15% of polyethylene and 85% of polypropylene having a thickness of 150 microns.
Film B: A film of a blend of 10% of a copolymer of 90% ethylene and 10% vinyl acetate and of 90% of a polyethylene having a thickness of 100 microns.
Film C: A film of polybutene-1 having a thickness of 100 microns.
Film D: A film of 6-10-nylon having a thickness of 50 microns.
Film E: A film of polyvinyl chloride having a thickness of 250 microns.
Film F: A film of chlorinated polyvinyl chloride having a thickness of 250 microns.
Film G: A film of a blend of 97% of polyvinyl chloride and 3% of polypropylene having a thickness of 250 microns.

EXAMPLE 9

The polyvinyl chloride compositions as shown in Table 9 were fabricated into sheets using a conversed L-type calender roller of 16 inches.

Table 9

|  | Run No. |  |  |  |  |
|---|---|---|---|---|---|
|  | 1 | 2 | 3 | 4 | 5 |
| Polyvinyl Chloride (mean polymerization degree 700) | 100 | 100 | 100 | 0 | 100 |
| 5% Vinyl Acetate-Vinyl Chloride Copolymer (mean polymerization degree 650) | 0 | 0 | 0 | 100 | 0 |
| Post-chlorinated Polyethylene (mean molecular weight, about 38,000; chlorine content, 40%) | 0 | 2 | 20 | 20 | 50 |
| Ca-Zn Type Metal Soap (stabilizer) | 2 | 2 | 2 | 2 | 2 |
| Epoxidized Soybean Oil | 3 | 3 | 3 | 3 | 3 |
| Stearic Acid (lubricant) | 2 | 2 | 2 | 2 | 2 |

Each of the sheets thus prepared was heat sealed to the polyethylene surface of a laminated film composed of a polyethylene terephthalate film having a thickness of 25 microns and a highpressure process polyethylene film having a thickness of 60 microns prepared by extrusion over the following conditions.

| Hot Plate Temperature: | 220° C |
|---|---|
| Pressure Applied: | 2 kg/cm² |
| Heat Seal Period of Time: | 2 seconds |

Then, a peal strength of each of the heat sealed samples was measured using the method of ASTM-D-1876-61T, the results of which were shown in the following table.

Table 10

|  | Run No. |  |  |  |  |
|---|---|---|---|---|---|
|  | 1 | 2 | 3 | 4 | 5 |
| Peel Strength (kg/inch) | 0 | 0.3 | 1.8 | 2.2 | 2.5 |

The above results showed that the polyvinyl chloride resin blended with post-chlorinated polyethylene could be heat sealed with a polyethylene film.

The properties of the resin compositions shown in Table 9 are shown in Table 11.

Table 11

|  | I* | Units | II* | Run No. |  |  |  |  |
|---|---|---|---|---|---|---|---|---|
|  |  |  |  | 1 | 2 | 3 | 4 | 5 |
| Tensile Strength | ASTM-D-638 | kg/cm² | (i)* | 6.2 | 6.0 | 5.6 | 5.7 | 4.0 |
|  |  |  | (ii) | 6.0 | 5.8 | 5.4 | 5.4 | 3.8 |
| Elongation | ASTM-D-638 | % | (i)* | 46 | 55 | 74 | 94 | 152 |
|  |  |  | (ii) | 53 | 57 | 92 | 107 | 136 |
| Izod Impact Strength | ASTM-D-256 | ft-lb/inch | — | 0.8 | 1.0 | 4.2 | 3.8 | 6.3 |
| Vicat Softening Point | ASTM-D-1525 | ° C | — | 91.0 | 90.3 | 87.5 | 86.0 | 91.3 |
| Percent Transmission | ASTM-D-1003 | % | — | 90.9 | 90.7 | 86.5 | 87.2 | 70.3 |
| Moisture Permeability | ASTM-E-96 | g/m²-24 hrs. | — | 2.8 | 2.9 | 2.7 | 3.0 | 2.6 |

(Note):
(I): Measurement Method
(II): Direction (i): Parallel Direction; (ii): Vertical Direction The results showed that the polyvinyl chloride compositions containing 2 to 50 parts of chlorinated polyethylene clearly had the properties of polyvinyl chloride and could be heat sealed with polyethylene as stated above.

EXAMPLE 10

A two-layer extrusion type film forming apparatus composed of an extruder I having an inside diameter of 90 mm. and an extruder II having an inside diameter of 50 mm in which the melts from the extruders were combined through two manifolds and welded in the same die was used. Low-density polyethylene having a melt index of 1.0 was melt-extruded through the extruder II to form a film thereof having a thickness of about 100 microns and the vinyl chloride resin composition as shown in Table 12 was melt-extruded through the extruder to form a thickness of about 500 microns, whereby a two-layer extruded film was prepared.

Table 12

|  | Run No. |  |
|---|---|---|
|  | 6 | 7 |
| Polyvinyl Chloride (mean polymerization degree 700) | 100 | 100 |
| Post-chlorinated Polyethylene (mean molecular weight, about 30,000; chlorine content 30%) | 0 | 20 |
| Octyltin-type Stabilizer | 3.5 | 3.5 |
| Epoxidized Soybean Oil | 4.0 | 4.0 |
| Alkylphenol-type Antioxidant | 0.4 | 0.4 |
| Stearic Acid (lubricant) | 2.0 | 2.0 |
| Butyl Stearate Ester | 0.8 | 0.1 |

After cooling, the adhesion of the laminate film was measured. The results showed that the composite film of Run No. 6 was readily separated into two layers, while the composite film of Run No. 7 could not readily be separated each other. Thus, 11 lattice cuts were formed in the polyethylene film side of the composite film in a depth deeper than the thickness of the polyethylene film layer with a distance of 2 mm using a sharp edge and after applying an adhesive tape to the surface of the cutformed layer of the composite film and manually pressing the adhesive tape, the adhesive tape was separated manually. No latticecut polyethylene layers were carried by the adhesive tape, which showed that the two heat sealed layers of the composite film of Run No. 7 had sufficient adhesive strength.

This example showed that a heat sealed composite sheet of polyvinyl chloride and an olefinic polymer could be prepared by a co-extrusion method, which has never been attained using conventional techniques.

EXAMPLE 11

Each of the polyvinyl chloride (mean polymerization degree of 700) compositions shown in Table 13 was fabricated into a sheet having a thickness of 250 microns using a calender roller.

Table 13

|  | Run No. | |
|---|---|---|
|  | 8 | 9 |
| Polyvinyl Chloride | 100 parts | 100 parts |
| Post-chlorinated Polyethylene (mean molecular weight, about 30,000; chlorine content 30%) | 20 " | 0 " |
| Ca-Zn-type Stabilizer | 2 " | 2 " |
| Epoxidized Soybean Oil | 3 " | 3 " |
| Stearic Acid (lubricant) | 2 " | 2 " |

Then, each of the following three kinds of olefinic polymers was extruded into a sheet having a thickness of 50 microns using an extruder.

(1) Polyethylene (2) A blend of 90% of polyethylene and 10% of a ethylene/vinyl acetate copolymer.

(3) Ionomer of ethylene and sodium acrylate.

Each of the films thus prepared and the film of Run No. 8 or Run No. 9 were passed through a press roll to form a composite film.

Th two polymer layers of the laminate of Run No. 9 were readily separated after cooling, while the polymer layers of the laminate of Run No. 8 were not separated even using the adhesive tape test as in Example 10.

EXAMPLE 12

Each of the compositions shown in the following table was fabricated into a sheet having a thickness of 500 microns using a calender roller.

Table 14

|  | Run No. | | | |
|---|---|---|---|---|
|  | 10 | 11 | 12 | 13 |
| Polyvinyl Chloride (mean polymerization degree about 1,000) | 100 | 100 | 0 | 0 |
| Vinyl Chloride Copolymer containing 5% Vinyl Acetate (mean polymerization degree about 800) | 0 | 0 | 100 | 100 |
| Post-Chlorinated Polyethylene (mean molecular weight, about 30,000; chlorine content about 35%) | 0 | 30 | 0 | 30 |
| Phthalic Acid Type Plasticizer | 10 | 10 | 10 | 10 |
| Pb-Type Stabilizer | 3 | 3 | 3 | 3 |
| Stearic Acid (lubricant) | 2 | 2 | 2 | 2 |

The above-described sheets were piled to form a laminate having a thickness of 10 mm and then after placing a polyethylene sheet having a thickness of 1 mm on the laminate, they were pressed under the following conditions.

| Hot Plate Temperature | 180° C |
|---|---|
| Pressure Applied: | 100 kg/cm$^2$ |
| Pressing Period of Time: | 10 minutes |

The area of the laminate was 1 m × 1 m

When the composite product was cooled and withdrawn, the polyethylene sheet was readily separated from the polyvinyl chloride sheet in Run No. 10 and Run No. 12, while the polyethylene sheet was not separated manually from the polyvinyl chloride sheet in Run No. 11 and Run No. 13.

While the invention has been described in detail and with reference to specific embodiments thereof, it will be apparent to one skilled in the art that various changes and modifications can be made therein without departing from the spirit and scope thereof.

What is claimed is:

1. A method of adhering a thermoplastic resin and an olefinic polymer which comprises pressing under heating a thermoplastic resin comprising
    (a) 2 to 50 parts by weight of post-chlorinated polyethylene having a specific gravity of 1.00 to 1.35 and a chlorine content of 5 to 50% and a mean molecular weight of from about 20,000 to 200,000
    (b) 100 parts by weight of polyvinyl chloride having a mean degree of polymerization from about 300 to 2,500, and said olefinic polymer.

2. The method as claimed in claim 1, wherein said olefinic polymer is extruded through an extruder and then laminated with said thermoplastic resin.

3. The method as claimed in claim 1, wherein said thermoplastic resin and said olefinic polymer are co-extruded.

4. The method as claimed in claim 1, wherein said thermoplastic resin and said olefinic polymer are heat sealed.

5. The method as claimed in claim 1, wherein said adhesion is conducted using a pressing machine.

6. The method of claim 1 wherein at least one of said post-chlorinated polyethylene or said polyvinyl chloride is performed or both thereof are co-extruded into a laminate.

7. The method of claim 1 wherein pretreatment or priming agents are not employed.

8. The method of claim 1 wherein a non-crystalline chlorinated polyethylene is employed as said post-chlorinated polyethylene.

* * * * *

UNITED STATES PATENT AND TRADEMARK OFFICE
CERTIFICATE OF CORRECTION

PATENT NO. : 4,089,726
DATED : May 16, 1978
INVENTOR(S) : Ko ISHII et al

It is certified that error appears in the above-identified patent and that said Letters Patent are hereby corrected as shown below:

IN THE HEADING:

Foreign Application Priority Data

Delete "Dec. 22, 1972" insert -- Dec. 27, 1972 --

Signed and Sealed this

Sixth Day of November 1979

[SEAL]

Attest:

RUTH C. MASON
Attesting Officer

LUTRELLE F. PARKER
Acting Commissioner of Patents and Trademarks